United States Patent
Witt, Jr. et al.

(10) Patent No.: US 9,033,363 B2
(45) Date of Patent: May 19, 2015

(54) AIRBAG ASSEMBLIES WITH HEAT SHIELD DEFLECTORS

(71) Applicant: AUTOLIV ASP, INC., Ogden, UT (US)

(72) Inventors: John F. Witt, Jr., Clinton Township, MI (US); David W. Schneider, Waterford, MI (US); Michael Kutchey, Ortonville, MI (US); Jamie R. Fritz, Macomb, MI (US)

(73) Assignee: AUTOLIV ASP, INC., Ogden, UT (US)

( * ) Notice: Subject to any disclaimer, the term of this patent is extended or adjusted under 35 U.S.C. 154(b) by 111 days.

(21) Appl. No.: 13/841,520

(22) Filed: Mar. 15, 2013

(65) Prior Publication Data

US 2014/0265262 A1    Sep. 18, 2014

(51) Int. Cl.
*B60R 21/261* (2011.01)
*B60R 21/262* (2011.01)
*B60R 21/206* (2011.01)

(52) U.S. Cl.
CPC ............ *B60R 21/261* (2013.01); *B60R 21/206* (2013.01); *B60R 21/262* (2013.01)

(58) Field of Classification Search
CPC .... B60R 21/261; B60R 21/262; B60R 21/206
USPC ................................ 280/728.2, 740, 742, 736
See application file for complete search history.

(56) References Cited

U.S. PATENT DOCUMENTS

| | | | |
|---|---|---|---|
| 6,419,266 B1 * | 7/2002 | Morfouace et al. | 280/740 |
| 6,846,013 B2 * | 1/2005 | Smith | 280/740 |
| 7,370,884 B2 | 5/2008 | Clark et al. | |
| 7,669,886 B2 | 3/2010 | Astrom | |
| 8,408,582 B2 | 4/2013 | Lunt et al. | |
| 8,820,784 B1 * | 9/2014 | Mayville et al. | 280/742 |
| 2011/0316263 A1 | 12/2011 | Lunt et al. | |
| 2013/0099469 A1 * | 4/2013 | Rick | 280/741 |
| 2014/0062072 A1 * | 3/2014 | Acker et al. | 280/740 |

FOREIGN PATENT DOCUMENTS

WO    WO 2012150005 A1 * 11/2012

* cited by examiner

*Primary Examiner* — Paul N Dickson
*Assistant Examiner* — Joselynn Y Sliteris
(74) *Attorney, Agent, or Firm* — Stoel Rives LLP

(57) ABSTRACT

Heat shields are used to shield an airbag from hot gasses issuing from an inflator. The heat shields can have a low thermal conductivity and may be capable of melting during a deployment event.

19 Claims, 16 Drawing Sheets

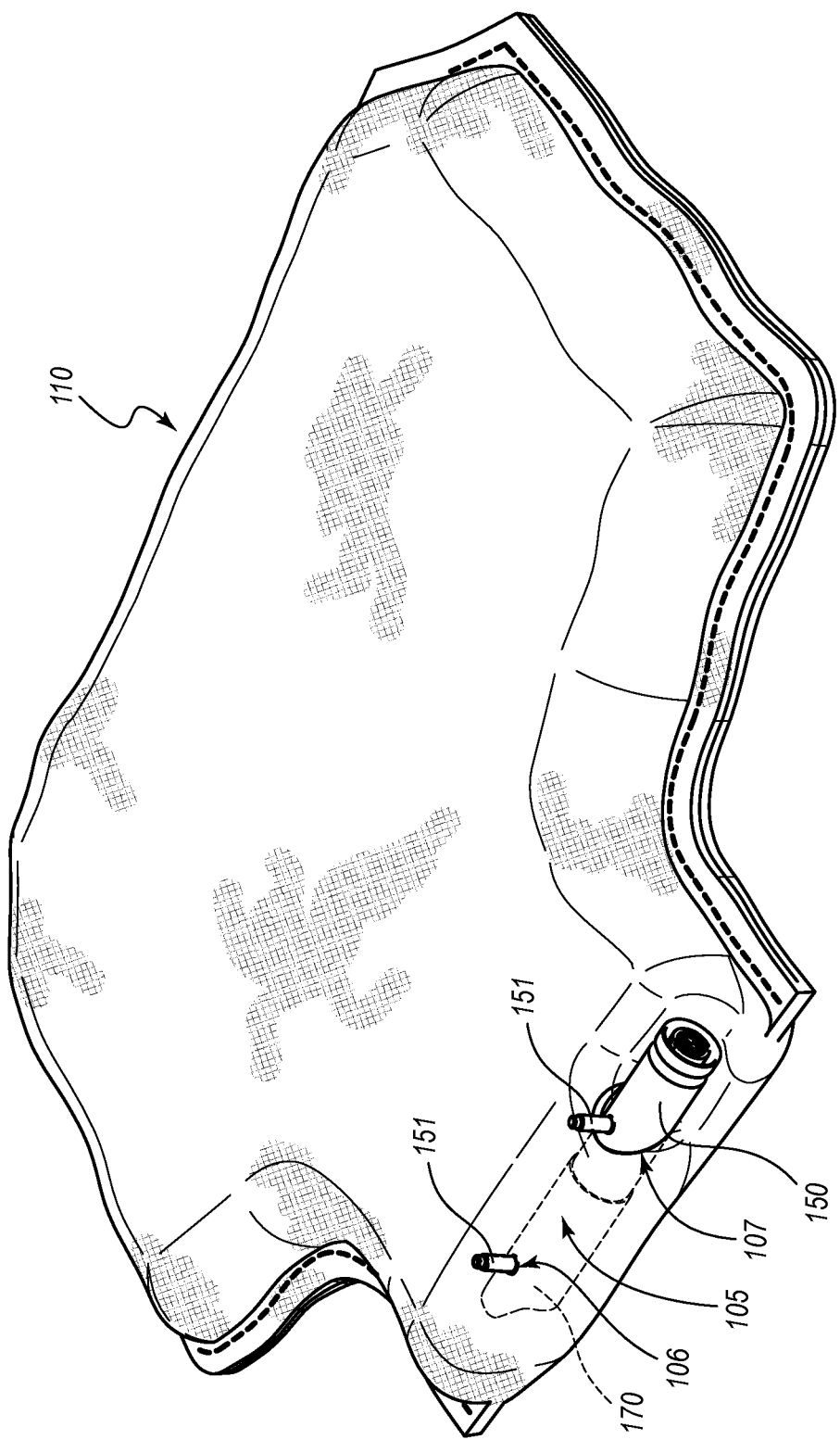

AIRBAG ASSEMBLIES WITH HEAT SHIELD DEFLECTORS

TECHNICAL FIELD

The present disclosure relates generally to the field of automotive protective systems. More specifically, the present disclosure relates to inflatable airbag cushion assemblies having heat shields.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments, and are, therefore, not to be considered to be limiting of the disclosure's scope, the embodiments will be described and explained with specificity and detail in reference to the accompanying drawings, in which:

FIG. 10 is a perspective view of the airbag cushion coupled to the inflator and the heat shield deflector.

DETAILED DESCRIPTION

Figure 1A:
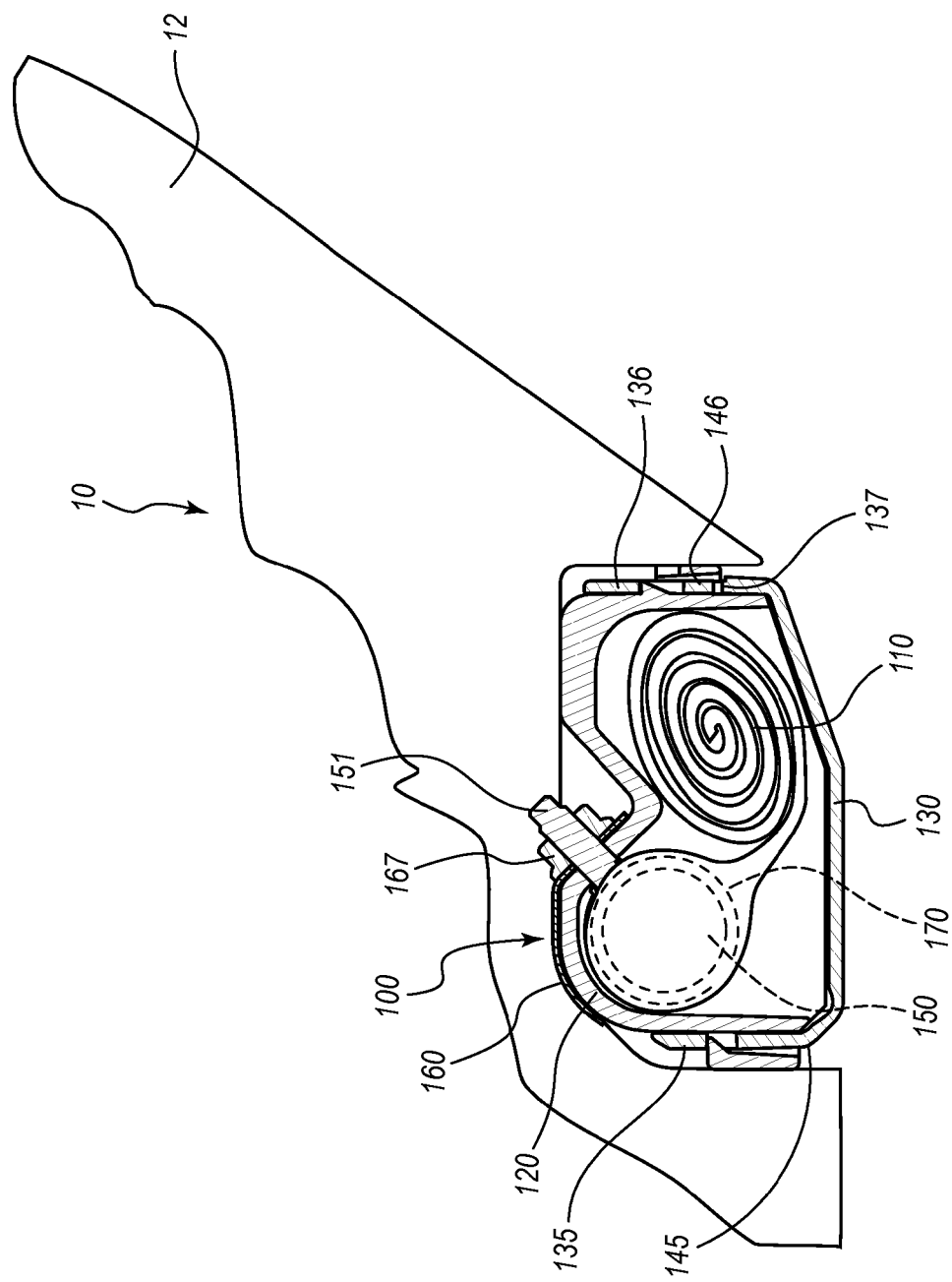
FIG. 1A is a cross-sectional side elevation view of an airbag assembly, wherein the airbag assembly is in a packaged configuration and is attached to a vehicle under a knee bolster of the vehicle.

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments. While the various aspects of the embodiments are presented in drawings, the drawings are not necessarily drawn to scale unless specifically indicated.

The phrases "coupled to" and "in communication with" refer to any form of interaction between two or more entities, including mechanical, electrical, magnetic, electromagnetic, fluid, and thermal interaction. Two components may be coupled to each other even though they are not in direct contact with each other.

Inflatable airbag systems are widely used to minimize occupant injury in a collision scenario. Airbag modules have been installed at various locations within a vehicle, including, but not limited to, the steering wheel, the instrument panel, within the side doors or side seats, adjacent to roof rail of the vehicle, in an overhead position, or at the knee or leg position. In the following disclosure, "airbag" may refer to an inflatable curtain airbag, overhead airbag, front airbag, side airbag, knee airbag, or any other airbag type.

During installation, the airbags are rolled, folded, or both, and are retained in the packaged configuration behind a cover. During a collision event, vehicle sensors trigger the activation of an inflator, which rapidly fills the airbag with inflation gas. Thus the airbag rapidly changes configurations from a packaged configuration to an expanded configuration. During the process of inflation, the inflation gasses can exit through ports of the inflator at high temperature. Where the inflation gasses are permitted to flow directly from the exit ports into contact with the airbag cushion, the heat may damage or burn through the cushion in some instances, thus compromising the airbag cushion and/or causing it to malfunction or fail. For example, if the exit ports are directed toward a portion of the airbag that is fixed relative to the inflator and incapable of moving away from the inflator, sustained delivery of hot inflation gases to the fixed portion of the airbag may burn through the airbag material. Deflectors can be used to redirect the hot inflation gases from the inflator to portions of the airbag cushion that are capable of expanding. Thus, although the expandable portions of the airbag cushion may be heated by the inflation gases, the expansion of the airbag and movement of the airbag portions away from the concentrated, high-velocity, high-heat inflation gases in the vicinity of the inflator can prevent the expandable portions of the airbag from burnout or other heat damage. However, in some embodiments, the deflectors may have high thermal conductivity and may nevertheless rapidly transfer heat from the inflation gases to the airbag cushion. This can similarly result in airbag malfunction or failure, such as in situations where the deflector is in abutting contact with the airbag cushion. For example, a heated deflector may similarly, melt, burn through, or otherwise damage the airbag cushion. Embodiments disclosed herein can address, ameliorate, and/or resolve one or more of the issues just discussed. Other and/or further advantages of various embodiments will also be evident from the present disclosure.

In some embodiments, a heat shield deflector may prevent heat that is generated during inflation of an airbag from compromising the effectiveness of the airbag cushion assembly or causing failure of the airbag cushion assembly during inflation. For example, in some embodiments, the heat shield deflector can be configured to direct the flow of inflation gasses such that the heat generated during airbag inflation is dispersed. In some embodiments, the heat shield deflector can be made of a material that has a low thermal conductivity, and thus slows the transfer of heat from the inflation gases, through the heat shield deflector, and to the airbag cushion. For example, in some embodiments, the heat shield deflector can have insulating properties, and the heat shield deflector may absorb a portion of the heat generated during airbag inflation. In some embodiments, the heat shield deflector can be made of a material that has a melting point that is lower than the expulsion temperature of the inflation gasses during airbag inflation and/or may melt as a result of heat absorbed from the inflation gases. The heat shield deflector may undergo a phase transition and may be permanently deformed due to the heating from the inflation gasses. The heat shield deflector may operate as a sacrificial element that is capable of maintaining a desired profile to deflect inflation gases in a desired pattern during at least a majority of a deployment event, and as a result of the heat absorbed during deflection of the inflation gases, may be deformed to a different profile during and/or after expulsion of a final amount of inflation gases from the inflator.

FIGS. 1A-1D depict side elevation views of an illustrative airbag assembly 100 changing from a packaged configuration to an inflated, deployed configuration. As shown in FIGS. 1A-1D, the airbag assembly 100 may comprise an inflatable airbag cushion 110, an airbag housing 120, a housing cover 130, a load distributing plate 160, an inflator 150, and a heat shield deflector 170. For clarity, a lateral sidewall of housing 120 is not depicted in the views of FIGS. 1A-1D (but is shown in FIG. 2).

The airbag assembly 100 is depicted as being in a low mount position in a knee bolster 12 of a vehicle 10. When in a low mount position, the cover 130 may be said to be horizontally oriented and/or parallel with a floor of the vehicle. In other embodiments, the airbag assembly 100 may be mounted in a mid- or high-mount position, which positions are well known in the art. In yet other embodiments, the airbag assembly 100 may be mounted in any other position known in the art depending on the type of airbag assembly that is being used.

Figure 2:
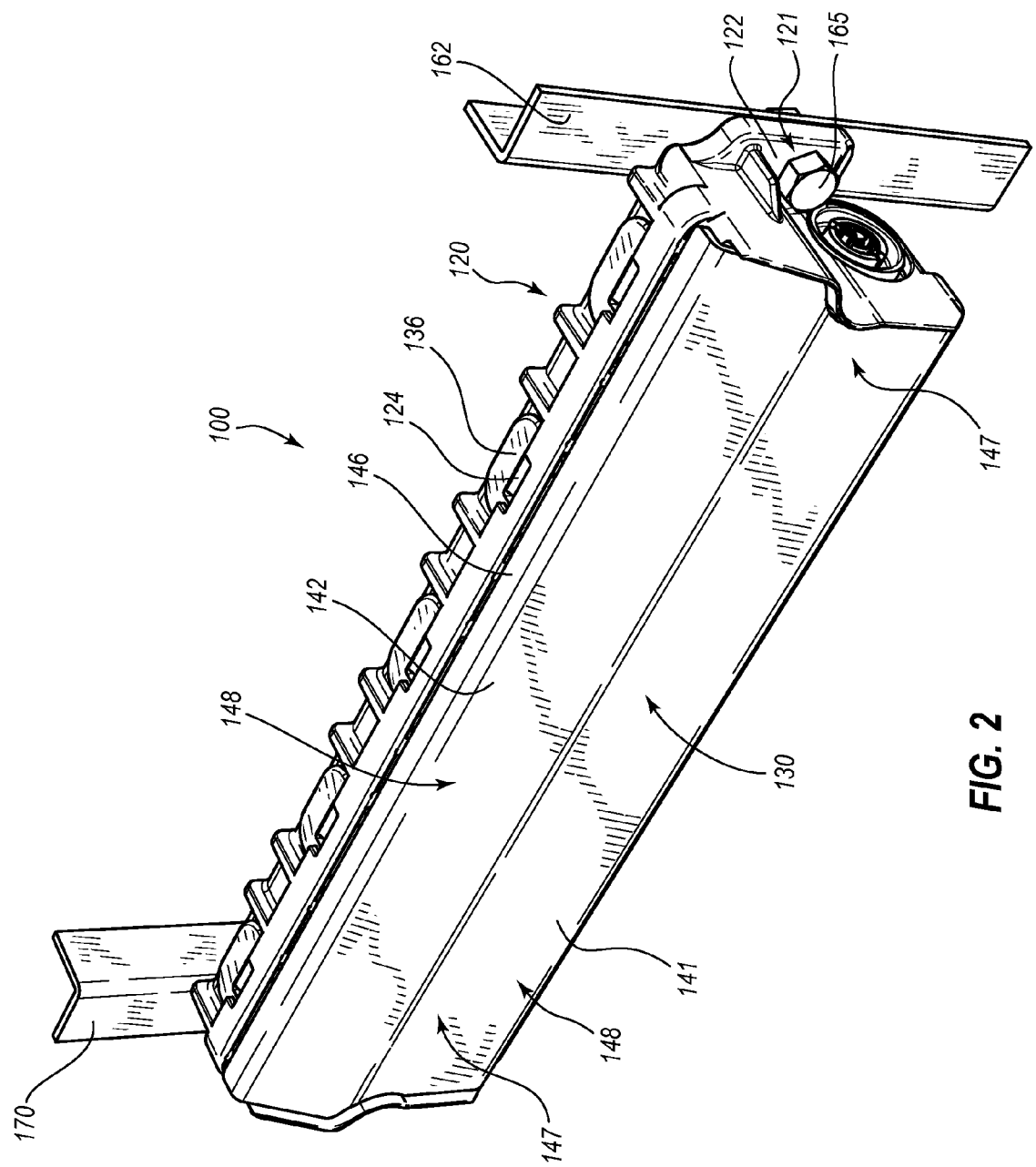
FIG. 2 is a perspective view of the airbag assembly of FIG. 1A mounted to a vehicle structure.

In the depiction of FIG. 1A, the airbag assembly 100 is in a packaged configuration, wherein the airbag cushion 110 is in a rolled and/or folded state and is retained within the housing 120 via the cover 130. The cover 130 may include a tear seam 137 located on a car-rearward portion, a car-forward end cap 145 that extends to a plurality of car-forward tabs 135, and a car-rearward end cap 146 that extends to a plurality of car-rearward tabs 136.

Figure 1B:
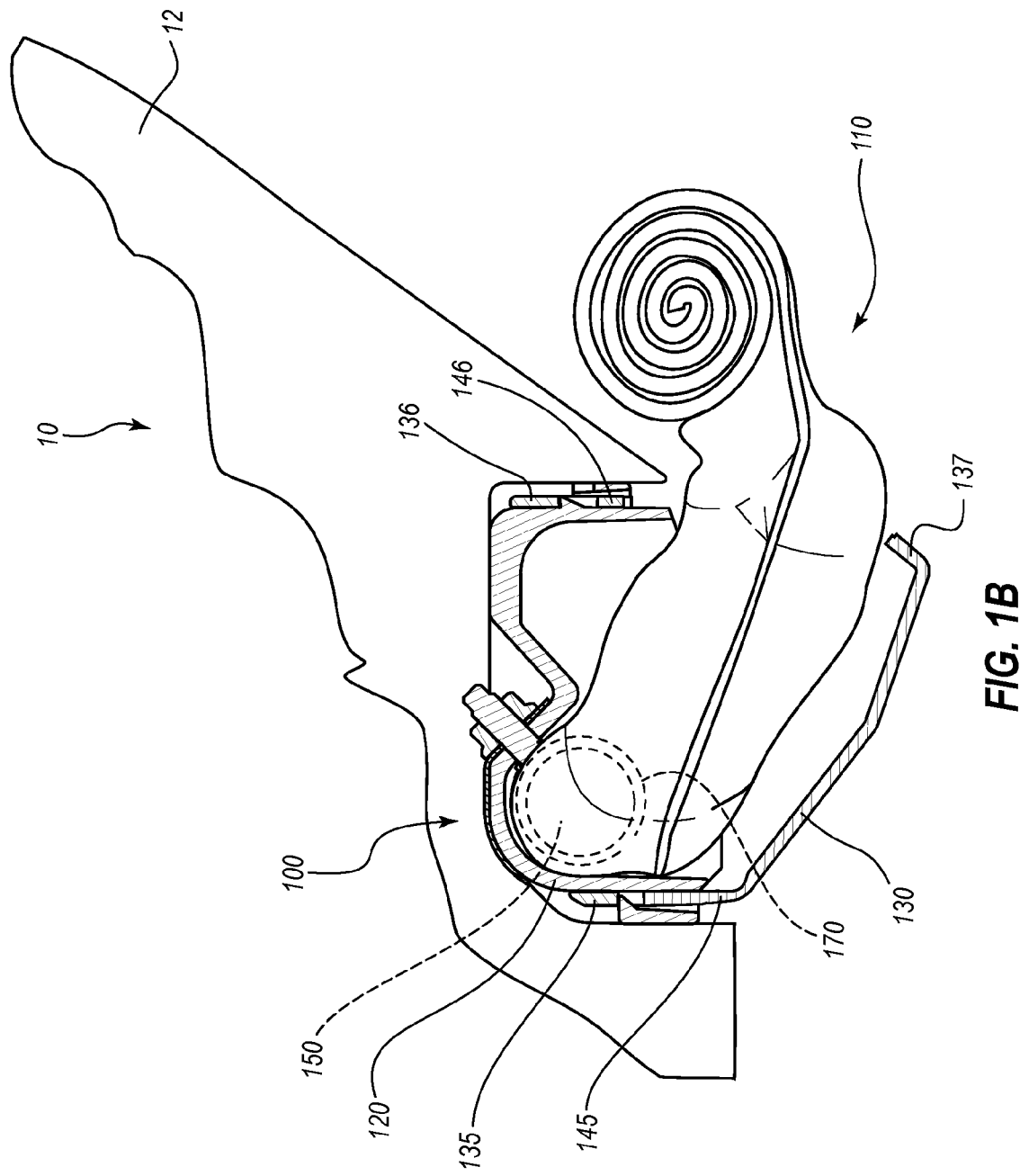
FIG. 1B is another cross-sectional side elevation view of the airbag assembly of FIG. 1A after an airbag has begun to be deployed.

In the depiction of FIG. 1B, the inflator 150 has been activated and the airbag cushion 110 has begun to be inflated. The inflator 150, which is configured to expel inflation gases through one or more ports, is fluidly coupled with the airbag cushion 110 such that inflation gases that exit the inflator 150 enter the airbag cushion 110 to fill the cushion. The heat shield deflector 170 encompasses a portion of the inflator 150 to redirect a flow of the inflation gasses after they have exited the inflator 150. That is, the heat shield deflector 170 can redirect the inflation gases from an initial flow path to a different flow path. For example, at least some of the inflation gases that initially exit the inflator along a trajectory directly toward a portion of the airbag cushion (e.g., a fixed portion of the airbag cushion) are redirected by the heat shield deflector 170 along a different flow path toward a different portion of the airbag cushion (e.g., a portion of the airbag cushion that is expandable). As further discussed below, the heat shield deflector 170 can delay heating of the portion of the airbag cushion 110 that is in contact with the heat shield deflector 170 due to a low thermal conductivity of the material of which the heat shield deflector 170 is formed. The heat shield deflector 170 may absorb heat from the inflation gases and, in some embodiments, can melt due to the absorbed heat.

With continued reference to FIG. 1B, the tear seam 137 in the cover 130 (see FIG. 1A) has ruptured and a portion of the airbag cushion 110 has exited the housing 120 in a car-rearward direction. In the illustrated embodiment, the cover 130 may be configured to aid the airbag cushion 110 in obtaining an initial trajectory that may be described as being primarily car-rearward, rather than car-downward, although other arrangements are also possible.

Figure 1C:
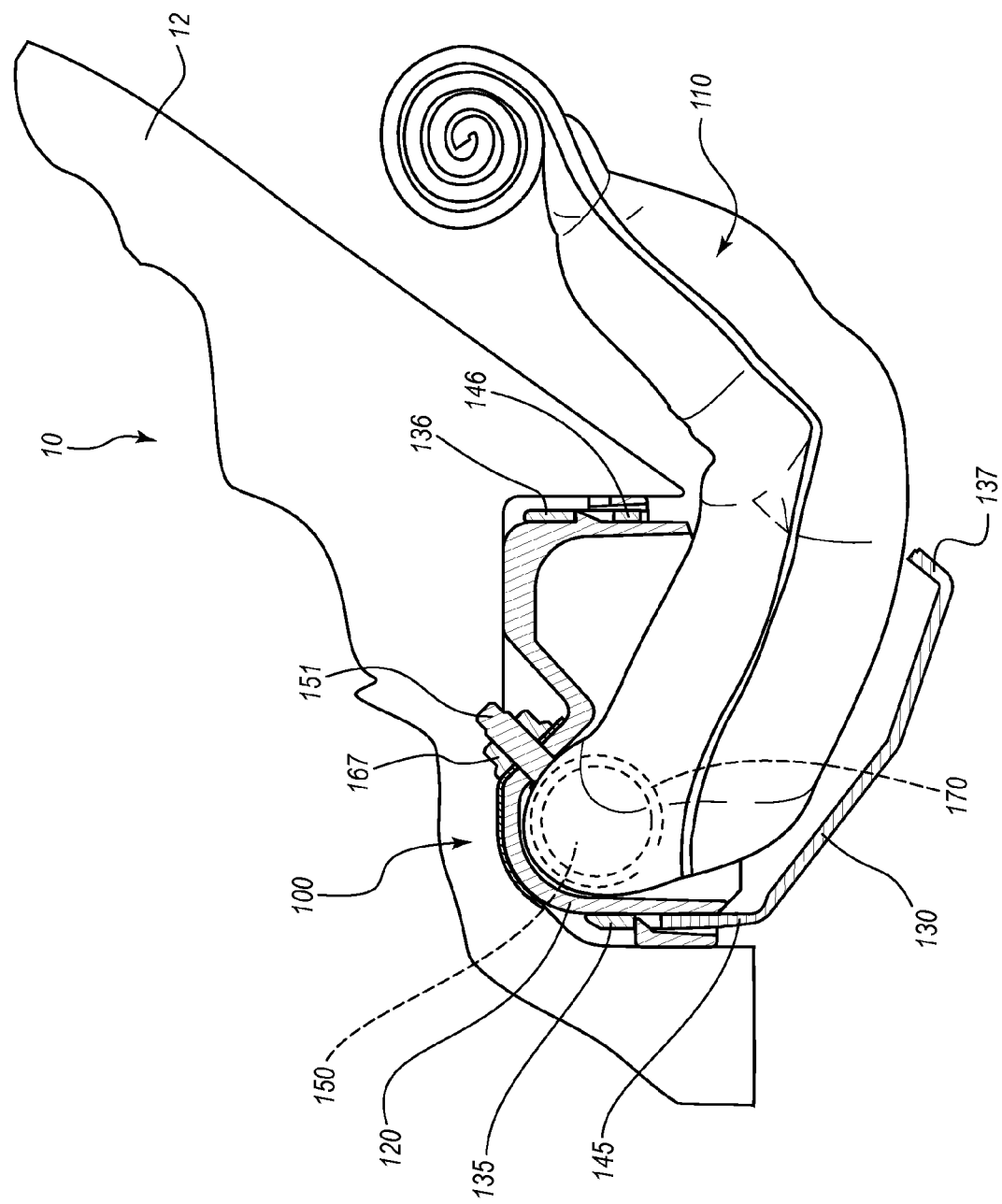
FIG. 1C is another cross-sectional side elevation view of the airbag assembly of FIG. 1A at a later time during airbag deployment.

In the depiction of FIG. 1C, the inflator 150 is continuing to generate inflation gas such that the airbag cushion 110 is continuing to be inflated; however, at this point in the airbag deployment, a primary direction of the airbag cushion 110 deployment trajectory is in a car-upward and car-rearward direction, such that the airbag can be said to deploy parallel with the knee bolster 12.

Figure 1D:
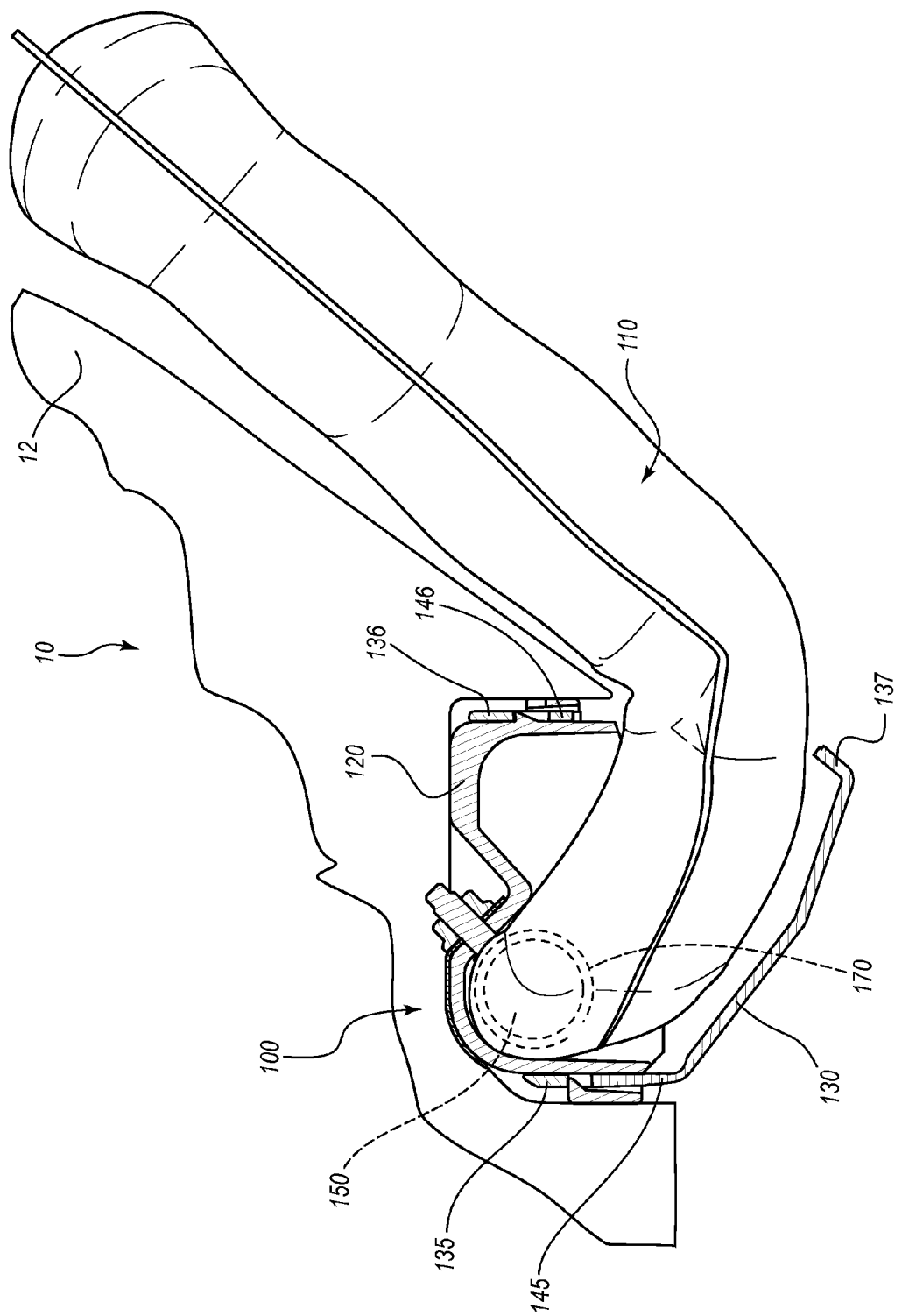
FIG. 1D is another cross-sectional side elevation view of the airbag assembly of FIG. 1A, wherein the airbag assembly is in an inflated, deployed configuration.

FIG. 1D depicts the airbag assembly 100 in an inflated, deployed configuration. The airbag cushion 110 may be said to be fully inflated or expanded. During and after deployment of the airbag cushion 110, the cover 130 may be configured to remain attached to the housing 120 via the plurality of car-forward tabs 135 that extend from the car-forward end cap 145. The plurality of car-rearward tabs 136 may also remain coupled to the housing 120, although the car-rearward tabs 136 may be severed from the car-rearward end cap 146 and the rest of the cover 130 at the tear seam 137.

FIG. 2 is a perspective view of the airbag assembly 100 of FIG. 1A, wherein the airbag assembly 100 has been coupled to a vehicle structure 162 in any suitable manner. In the illustrative embodiment, the portion of the vehicle structure 162 to which the airbag assembly 100 is mounted includes mounting brackets that are at either longitudinal end of the housing 120. The housing 120 of the airbag assembly 100 may comprise a suitable number of mounting regions 121 at which the housing is directly attached to the vehicle structure 162. In the illustrated embodiment, the housing 120 defines two mounting regions 121, and each mounting region 121 is at an opposing longitudinal end of the housing 120, as discussed further below.

In some embodiments, the mounting region 121 may comprise a mounting flange 122, which may be integral with the housing 120. As shown in FIG. 2, the mounting region 121 may extend from an end of the housing 120. For example, the mounting region 121 may extend from a lateral side of the housing 120. The mounting region 121 may be configured to couple the airbag assembly 100 to a vehicle structure 162 via any suitable mounting hardware 165, such as a bolt and a nut.

In some embodiments, the airbag assembly 100 may comprise a cover 130. The cover 130 may be substantially rectangular in shape, and may have two opposing laterally extending sides 147 and two opposing longitudinally extending sides 148. Each of the longitudinally extending sides 148 may comprise end caps, such as the car-rearward end cap 146 and the car-forward end cap, whereas neither laterally extending side 147 comprises an end cap. The cover 130 may also be described as having a car-forward portion 141 and a car-rearward portion 142.

The cover 130 may be coupled to the housing 120. As previously discussed, the car-rearward end cap 146 may extend to a plurality of car-rearward tabs 136. Similarly, although not shown in the drawings, the car-forward end cap may extend to a plurality of car-forward tabs. Each of the plurality of car-rearward tabs 136 and the plurality of car-forward tabs may comprise apertures. One or more protrusions 124 disposed on the housing 120 may engage the apertures of the car-rearward tabs 136 and car-forward tabs to couple the cover 130 to the housing 120. The protrusions 124 and apertures of the car-rearward tabs 136 and car-forward tabs may thus be described as structures for coupling the cover 130 to the housing 120.

Figure 3:
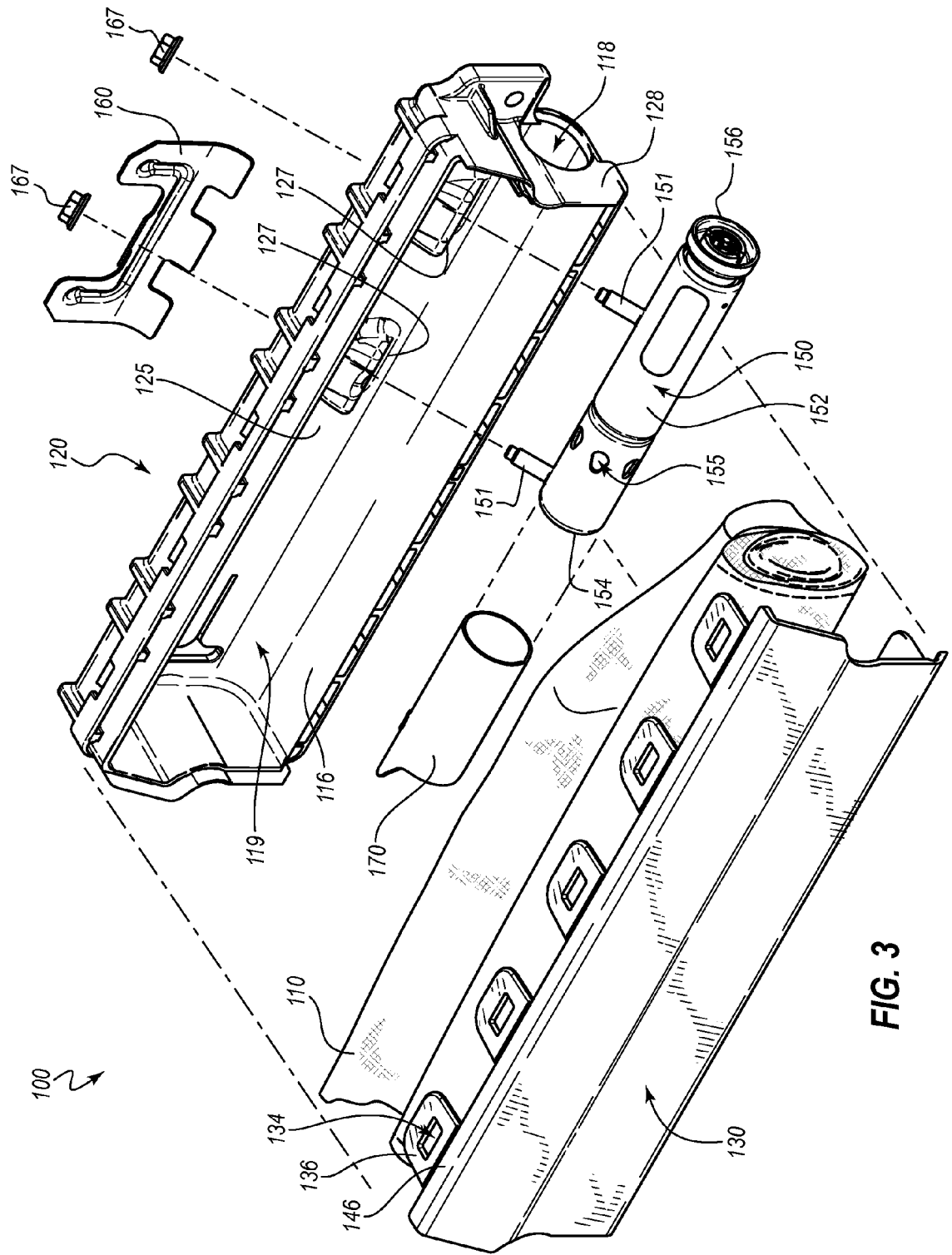
FIG. 3 is an exploded perspective view of the airbag assembly of FIG. 1A.
Figure 4:
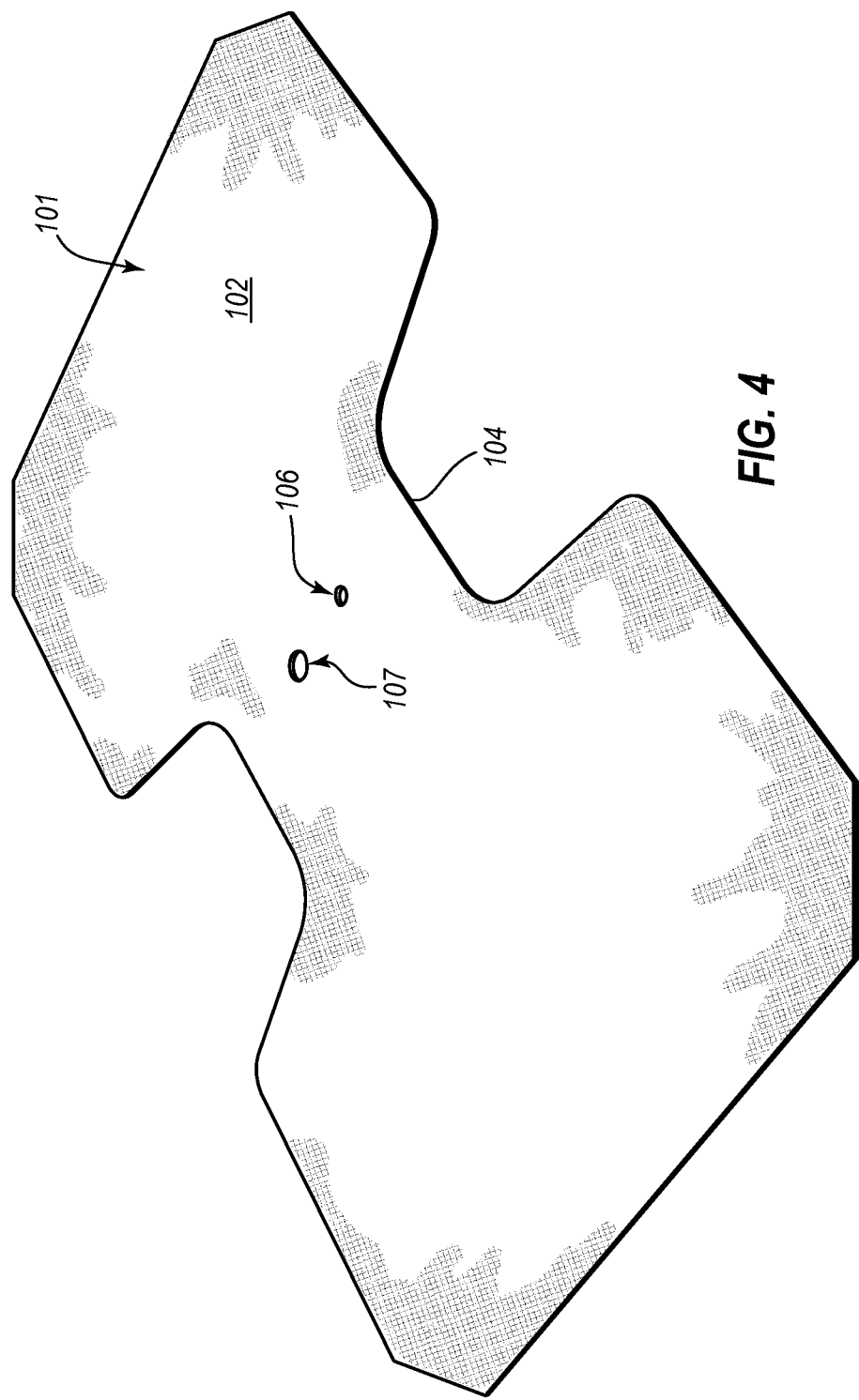
FIG. 4 is a perspective view of an embodiment of airbag material that has been cut to a desired size and shape to form an airbag cushion, wherein inflator apertures have also been cut into the material.

FIG. 3 is an exploded view of the airbag assembly 100 of FIG. 2, which provides another view of the housing 120, the cover 130, the inflator 150, the heat shield deflector 170, and the airbag cushion 110. As illustrated in FIG. 4, a cavity, chamber, or interior void 119 of the housing 120 may be partially defined by a back wall 125, two opposing longitudinally extending sidewalls 116 and two opposing laterally extending sidewalls 128. One laterally extending sidewall 128 may comprise an inflator insert aperture 118, which is configured to be aligned with an inflator insert aperture of the airbag cushion 110 such that the terminus 156 of the inflator 150 can be accessed or viewed even after the airbag assembly 100 is in a packaged configuration (as shown in FIG. 2). The cover 130 comprises a car-rearward end cap 146 extending to a plurality of car-rearward tabs 136. Similarly, although not depicted, the cover 130 comprises a car-forward end cap that extends to a plurality of car-forward tabs. Each of the plurality of car-rearward tabs 136 comprises apertures 134 that are configured to engage with the protrusions disposed on the housing 120.

In the illustrated embodiment, the housing and the cover are separate components that are configured to be coupled to one another. In other embodiments, the housing may comprise an integrated cover, such that the housing may be said to comprise a one-piece housing with a cover that is attached via a hinge. In yet other embodiments, the housing may be configured such that it does not utilize a cover at all.

A variety of types and configurations of airbag housings and covers may be employed. For example, in one embodiment, the housing and/or cover may comprise a stamped steel piece. In another embodiment, the housing and/or cover may comprise steel and plastic. The housing and cover may also comprise one or more of a variety of materials, including, for example, nylon, styrene ethylene butylene styrene (SEBS) block copolymers, polyolefin monomers or co-block polymers, polypropylene monomers or co-block polymers, thermoplastic elastomer olefin (TEO), and thermoplastic polyester elastomers (TPE). Certain of such materials may be sold under the trade names Hytrel, Tefabloc, Tosl, Sumitomo, Tekron, Basell, Hostacom, Multiflex, and TES.

In certain embodiments, the housing 120 can be rigid to provide reactive forces to the airbag 110 that tend to urge the airbag 110 to expand toward an exterior of the housing 120. The housing 120 can aid in directing the expansion of the airbag 110. For example, where the walls 116, 125, 128 are rigid and relatively immovable as the airbag 110 is deployed, the walls 116, 125, 128 can cause the airbag 110 to deploy in a direction that is generally away from the back wall 125. Further, in cooperation with the cover 130 and its opening characteristics, the deploying airbag 110 can be directed in a desired deployment pattern or direction that may additionally be generally away from one of the walls 116.

Although the housing 120 can be formed from any of a wide variety of materials (such as those discussed above) to achieve a desired rigidity, in some embodiments it can desirable for the housing 120 to nevertheless be lightweight, which can improve fuel efficiency of a vehicle. In other or further embodiments, the housing 120 may desirably be formed of relatively less material and/or thinner material, which can improve fuel efficiency and/or reduce manufacturing costs. Accordingly, in many embodiments, it may be desirable for the housing 120 to be formed of a lightweight, thin, and/or structurally weaker material.

The inflator 150 may be coupled to an interior surface of the housing 120. The inflator 150 may also be configured to fit within the interior void 119 and against the back wall 125 of the housing 120. In some embodiments, the inflator 150 may comprise a tubular body 152, a first terminus 156, a second terminus 154, and one or more mounting stems 151. The illustrated inflator 150 includes two mounting stems 151, one of which is proximal to the first terminus 156 and the other of which is more distally located relative to the first terminus 156. The inflator 150 may also comprise vents or ports 155 from which inflation gas may exit the inflator 150 after the inflator 150 is activated. In the illustrated embodiment, the ports 155 are in close proximity to the distally positioned mounting stem 151. The first terminus 156 may comprise an electric or electronic connection that is configured to allow inflator 150 to be placed in electronic communication with vehicle sensors. The connection or interface may be used to actuate the inflator 150.

In the illustrated embodiment, an end portion of the inflator 150 is positioned within a deflector 170, which may encompass the ports 155. For example, the deflector 170 may receive the end of the inflator 150 and may be coupled to the housing 120 via the distal mounting stem 151. The deflector 170 and its operation are discussed further below.

The mounting stems 151 may be configured to protrude through an aperture of the back wall 125 of the housing. The mounting stems 151 may also protrude through the inflatable airbag 110, and complementary mounting hardware 167, such as a nut.

The airbag cushion 110 may also be configured to fit within the interior void 119 of the housing 120. A variety of types and configurations of inflatable airbag can be utilized. For example, the size, shape, and proportions of the airbag may vary according to its use in different vehicles or different locations within a vehicle such that the airbag may comprise an inflatable curtain cushion, a rear passenger side airbag, a driver's airbag, a knee airbag, and/or a front passenger airbag. Also, the airbag may comprise any suitable material, such as, for example, a woven nylon fabric, which may be coated with a substance, such as silicone.

The airbag cushion 110 may be manufactured using a variety of techniques such as one piece weaving, cut and sew, or a combination of the two techniques. Further, the airbag cushion 110 may be manufactured using sealed or unsealed seams, wherein the seams are formed by stitching, adhesive, taping, radio frequency welding, heat sealing, or any other suitable technique or combination of techniques.

FIG. 4 is a perspective view of an inside face 102 of a panel of material 101, from which the airbag cushion 110 may be formed, in some embodiments. The panel 101 comprises a sheet of fabric that may comprise a woven nylon material, or any other material that is well known in the art. The panel 101 is generally rectangular in shape, but includes an indented middle portion 104. The panel 101 may be said to have an "I" or "H" shape. The length and/or width of panel 101 may be varied as desired. An inflator insert aperture 107 and an inflator stem aperture 106 may be formed in panel 101.

Figure 5:
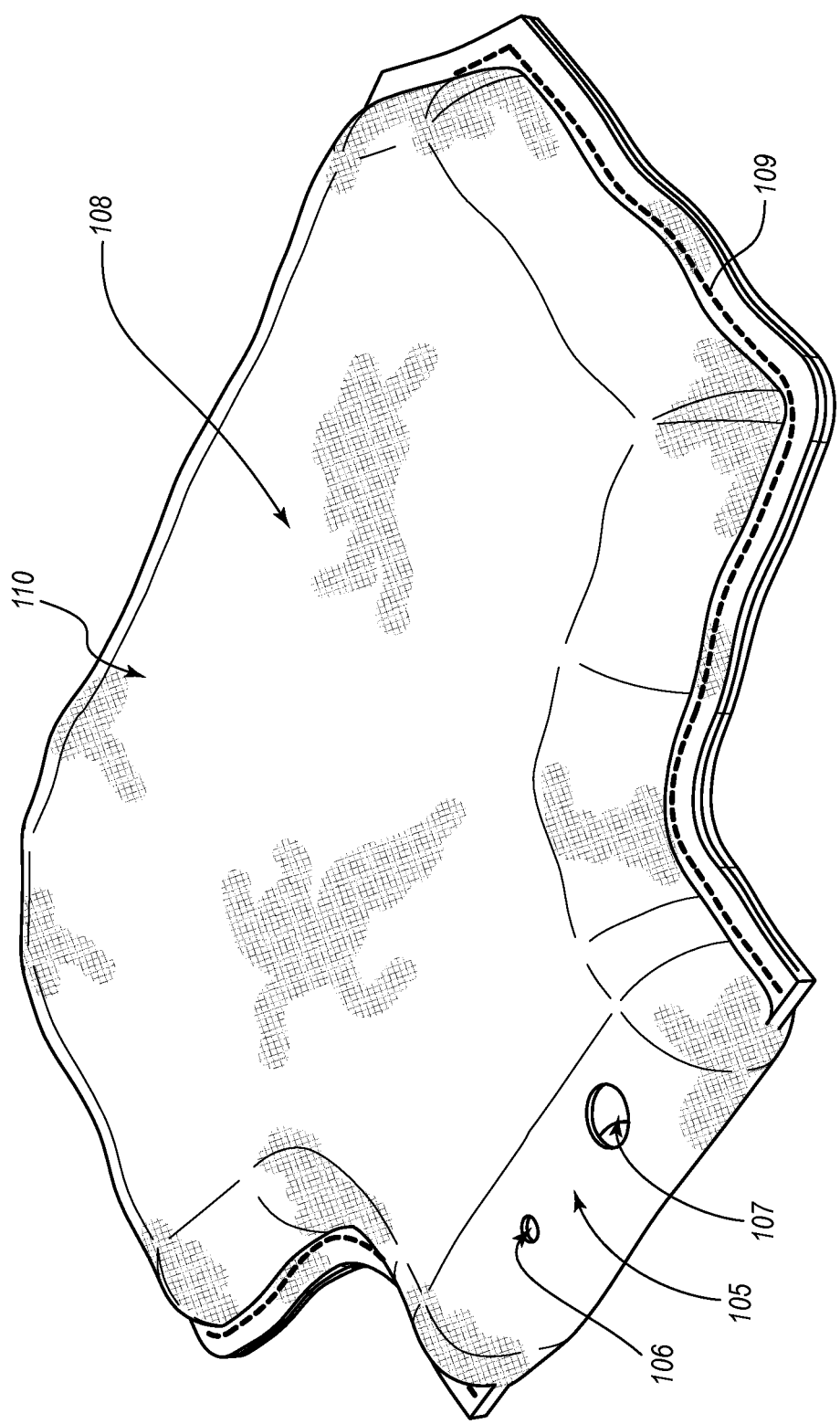
FIG. 5 is a perspective view of the formed airbag cushion.

FIG. 5 is perspective view of the airbag cushion 110 after it has been formed. The panel 101 has been folded in half and stitched about a periphery thereof via a seam 109. A fixable portion 105 of the airbag cushion 110 may be in the region of the apertures 106, 107. This portion of the airbag cushion 110 may be fixed relative to the housing 120 when the mounting stems 151 are secured in place. An inflatable portion 108 of the airbag cushion 110 includes an enlarged lobe that is configured to expand outwardly from the housing 120 during deployment.

Figure 6:
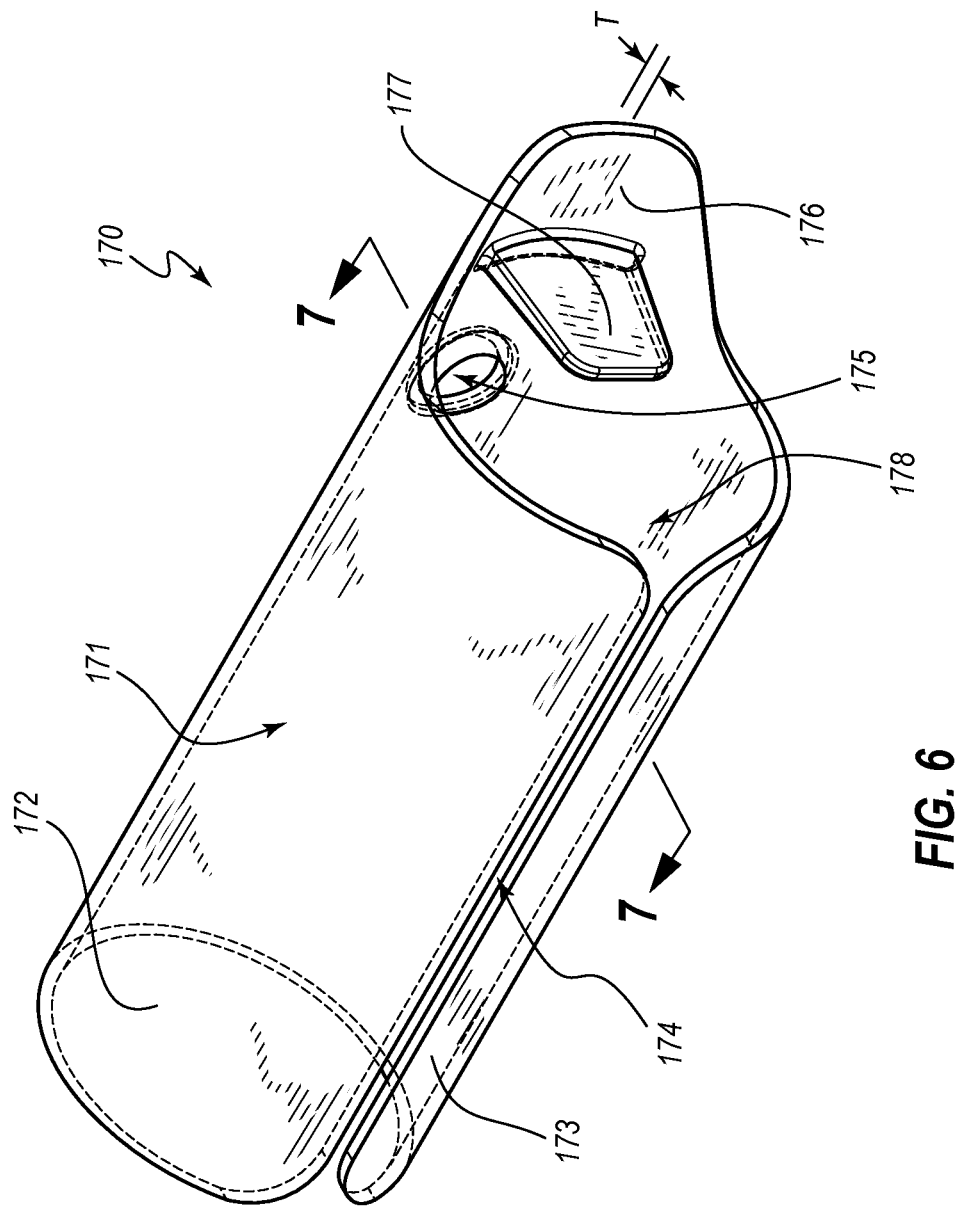
FIG. 6 is a perspective view of an embodiment of a heat shield deflector.
Figure 7:
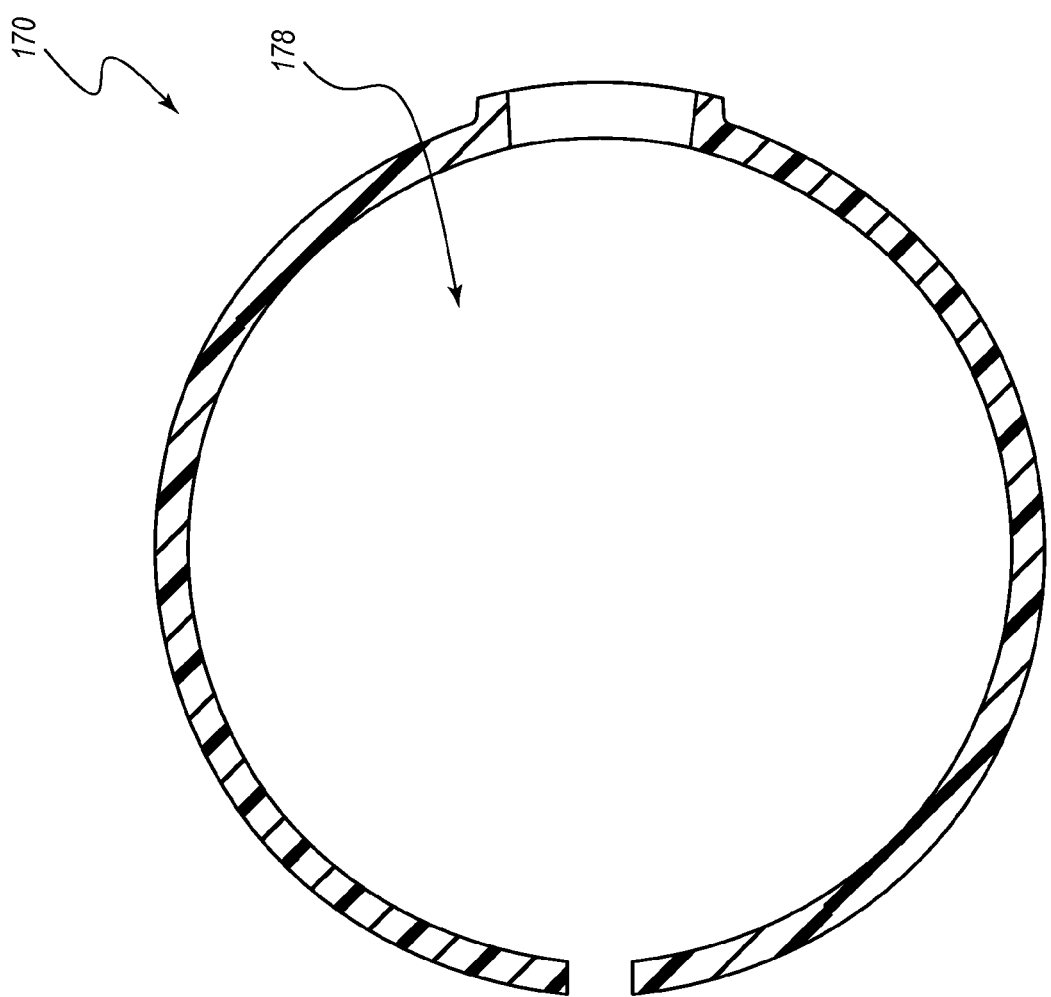
FIG. 7 is a cross-sectional view of the heat shield deflector of FIG. 6 taken along the view line 7-7 in FIG. 6.

FIGS. 6 and 7 show a perspective view and a cross-sectional view of the heat shield deflector 170, respectively. The heat shield deflector 170 can include an elongated body 171 that extends in a longitudinal direction. The body 171 can include two leaves or flaps 172, 173 that cooperate to define an opening 174. As further discussed below, the flaps 172, 173 can be configured to separate somewhat during airbag deployment, such that the opening 174 enlarges during deployment. The flaps 172, 173 may also be separated during assembly in order to insert the inflator 150 into a cavity 178 defined by the body 171, as further discussed below. As best seen in FIG. 7, the body 171 can define a substantially C-shaped cross-section along a plane that is transverse to the longitudinal axis of the body 171. The heat shield deflector 170 thus can encompass a large portion of the inflator 150, when both the inflator 150 and the deflector 170 are viewed in cross-section or end-on.

In some embodiments, the body 171 may define an aperture 175 through which a mounting stem 151 of the inflator 150 can extend. In the illustrated embodiment, the aperture 175 is positioned opposite the opening 174. The heat shield deflector 170 can further define a protrusion, stop, or shelf 177 that projects radially inward from the body 171. The shelf 177 can provide a surface against which a distal end of the inflator 150 can rest. The shelf 177 can help with aligning the mounting stem 151 of the inflator with the aperture 175 during manufacture of the airbag assembly 100, as the shelf 177 can prevent the inflator 150 from being advanced too far in a distal direction when the inflator 150 is coupled to the heat shield deflector 170. The shelf 177 may be placed in tension when the mounting stem 151 is inserted through the aperture 175, such as where the portion of the inflator 150 between the mounting stem 151 and the distal end of the inflator 150 is slightly longer than the distance between the aperture 175 and the shelf 177. This may aid in securing the inflator 150 to the heat shield deflector 170, and may be particularly useful in keeping these components coupled to each other during insertion of the inflator/deflector combination into the airbag cushion.

In some embodiments, the heat shield deflector 150 may include a tongue 176 at a distal end thereof. In some embodiments, the tongue 176 may aid during assembly of the airbag assembly 100, as discussed further below.

The heat shield deflector 170 can have a thickness T, which may be selected to provide the deflector with a desired set of physical properties. For example, depending on the material from which the deflector 170 is formed, the thickness T may be increased to increase the rigidity of the flaps 172, 173, or may be decreased to increase the flexibility of the flaps 172, 173. It can be desirable for the flaps 172, 173 to withstand the heat and pressure delivered thereto by the high-velocity gases exiting the inflator. In further embodiments, the thickness T may be selected to provide a desired amount of thermal shielding. For example, a greater thickness T can permit the heat shield deflector 170 to insulate the portion of the airbag cushion 110 that is at an exterior of the heat shield deflector 170, particularly the fixable portion 105 of the airbag cushion 110. In various embodiments, the heat shield deflector 170 may have a thickness T of no greater than about 0.5, 0.6, 0.7, 0.8, 0.9, 1.0, 1.5, or 2.0 millimeters, or within a range of from about 0.8 to about 1.0 millimeters. The thickness T may be constant or variable. For example, in some embodiments, the heat shield deflector 170 may have a greater thickness in regions that are susceptible to higher stresses (e.g., regions opposite the opening 174.

Figure 8:
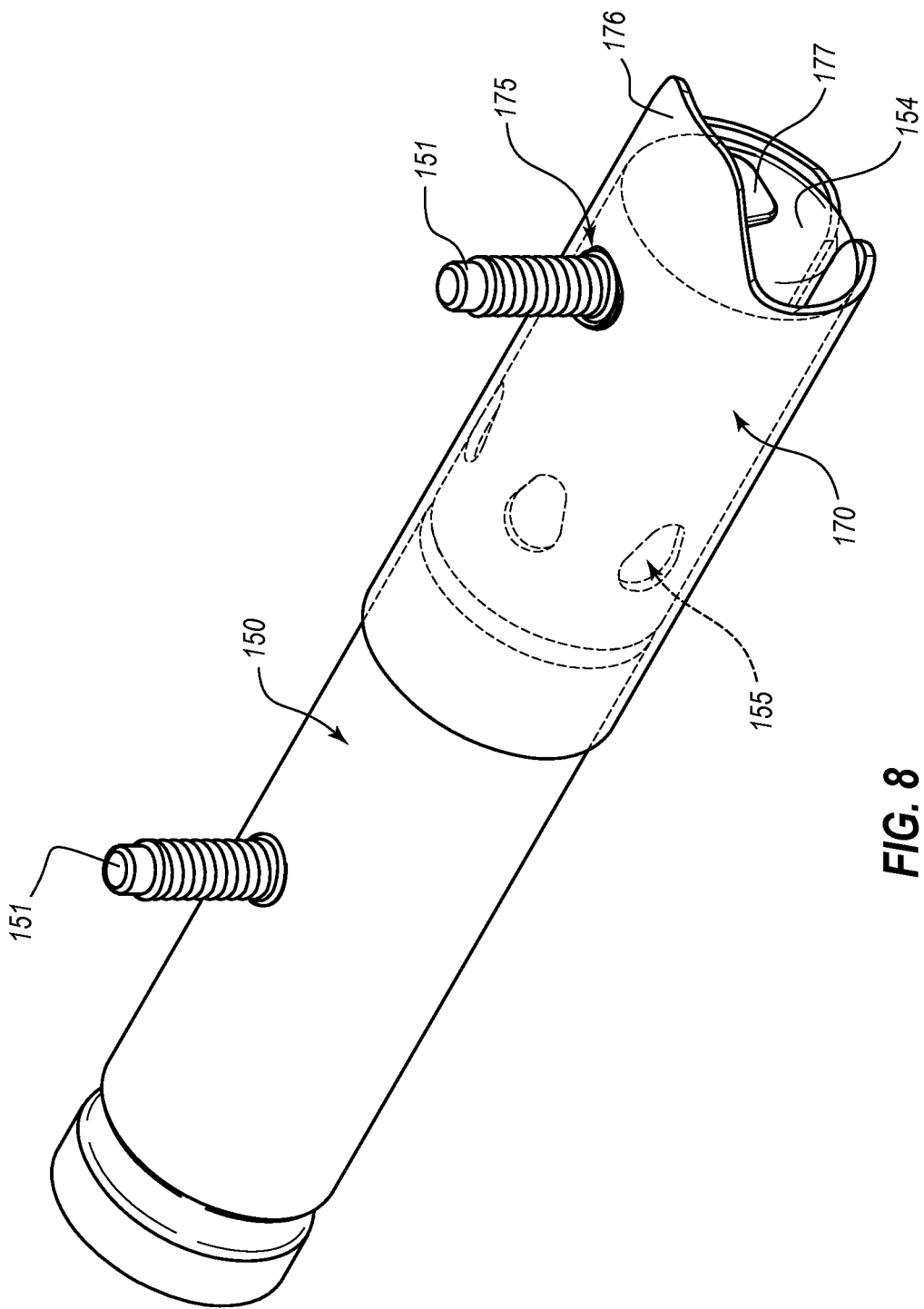
FIG. 8 is a perspective view of an embodiment of an inflator coupled with the heat shield deflector of FIG. 6.

FIG. 8 depicts the heat shield deflector 170 coupled to the inflator 150. In the illustrated embodiment, the heat shield deflector 170 extends only along a portion of the longitudinal length of the inflator 150. The deflector 170 encompasses the exit ports 155 at the distal end 154 of the inflator 150 to redirect the flow of inflation gases. The distal end 154 is shown in abutting contact with the shelf 177. The distal mounting stem 151 extends through the aperture 175.

Figure 9:
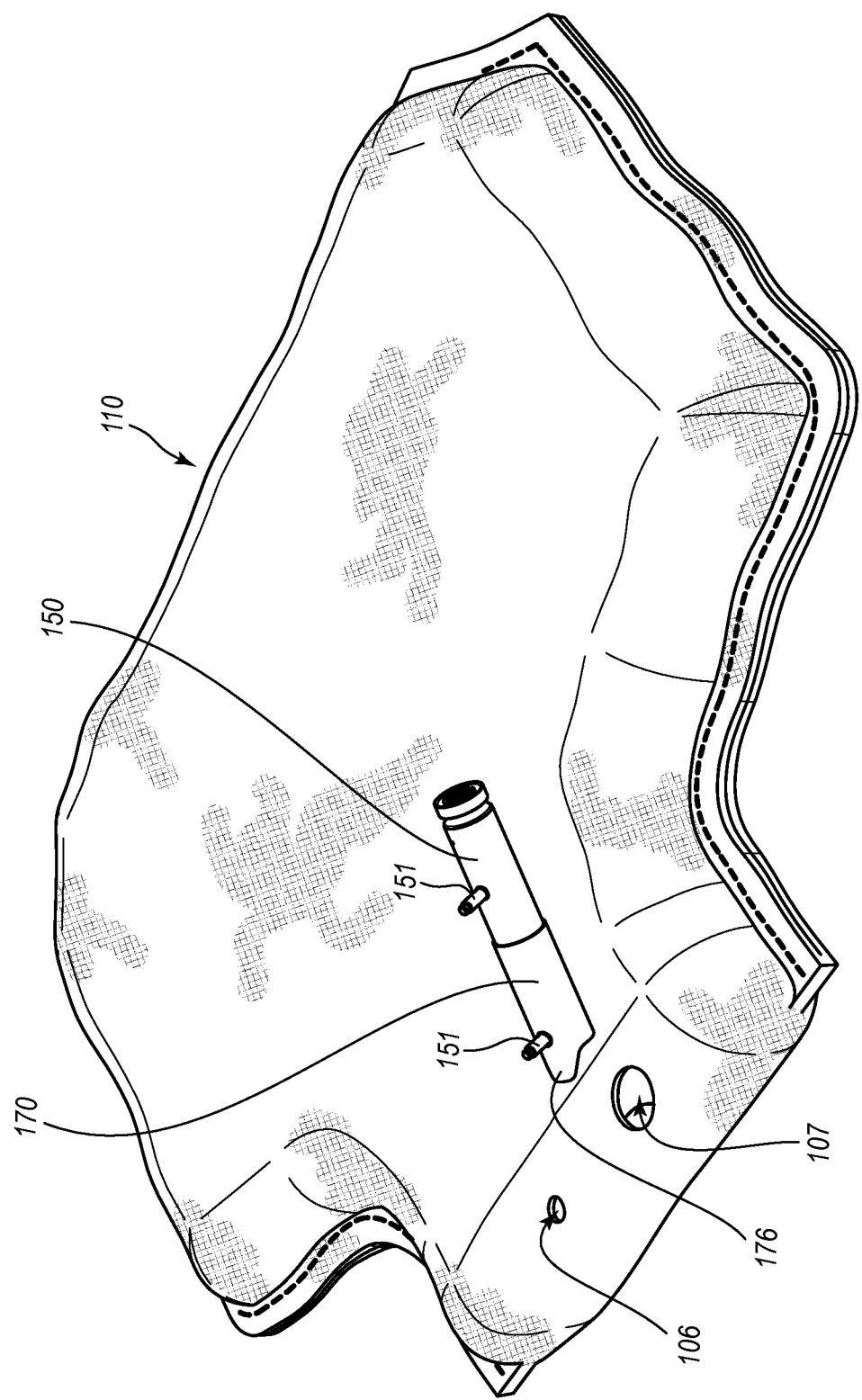
FIG. 9 is a perspective view of an early stage of a method of coupling the assembled inflator and the heat shield deflector with the airbag cushion.

FIG. 9 depicts the heat shield deflector 170 and the inflator 150 being inserted into the airbag cushion 110. The tongue 176 of the deflector 150 is inserted first, and may aid in opening or clearing the larger aperture 107 to aid in inserting the combination into an interior of the airbag cushion 110.

FIG. 10 illustrates the deflector/inflator combination after having been inserted into the airbag cushion 110. The distal and proximal mounting stems 151 protrude through the apertures 106, 107, respectively. The mounting stems 151 are within the fixable portion 105 of the airbag cushion 110. As can be appreciated, the fixable portion 105 of the airbag cushion 110 will be held against the housing 120 via the deflector 170 and the inflator 150 when the mounting stems 151 are secured to the housing 120 via the mounting hardware 167.

Figure 11A:
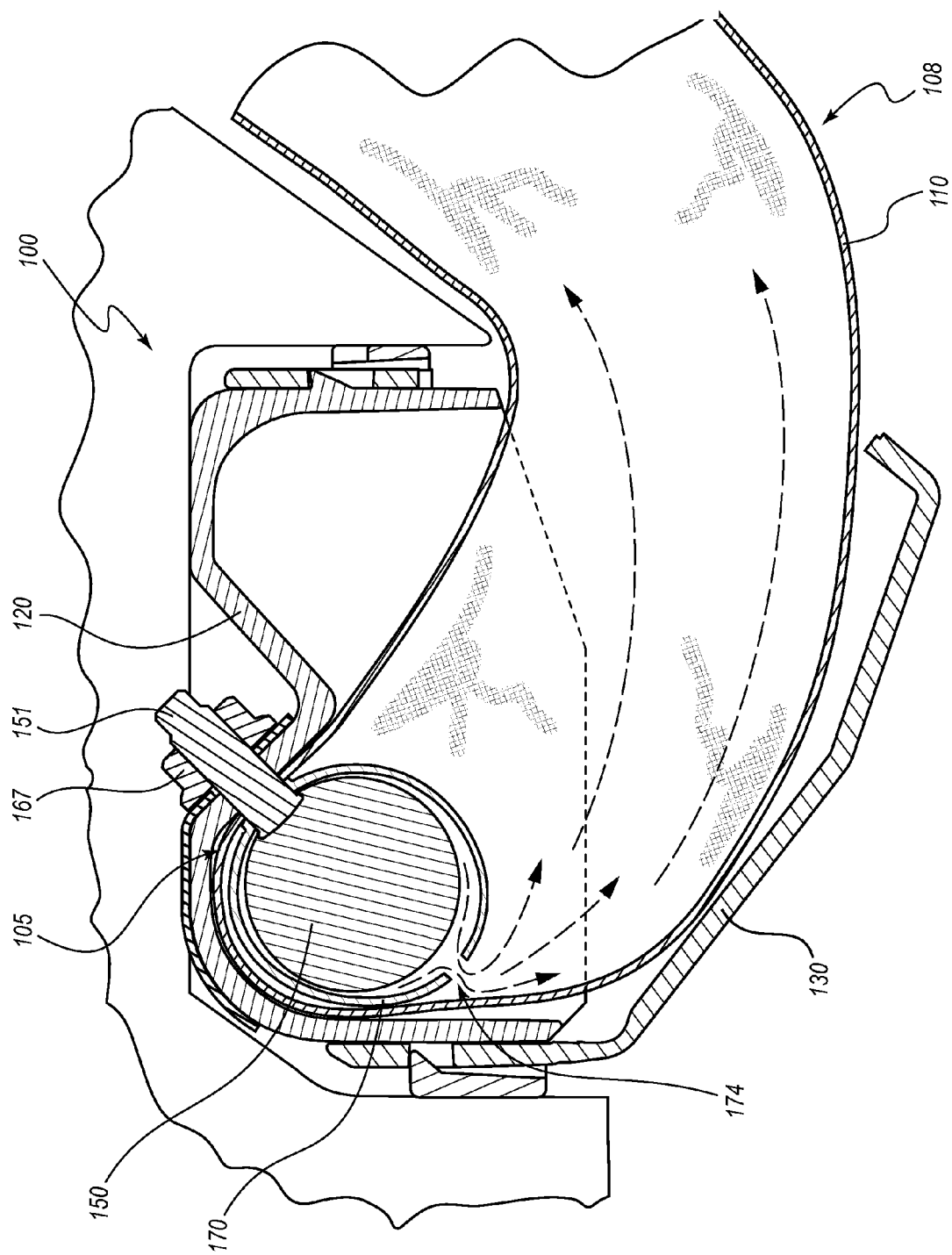
FIG. 11A is an enlarged cross-sectional side elevation view of the airbag cushion being deployed, wherein the heat shield deflector redirects inflation gases that exit from the inflator.

FIG. 11A depicts a point in time during a deployment event, wherein the inflator 150 expels inflation gases that are redirected by the heat shield deflector 170. For example, inflation gases that are originally directed toward the fixed portion 105 of the airbag cushion 110 are redirected about an exterior of the inflator toward and then through the opening 174 of the deflector 170. These hot inflation gases are thus redirected toward the inflatable portion 108 of the airbag cushion 110, where heat may more readily be dissipated due to an increasing volume of the airbag cushion 110. During the process of airbag inflation, heat that is absorbed by the deflector 170 from the inflation gases is slowly transferred through the thickness T of the deflector 170. In various embodiments, none of the absorbed heat, an insignificant portion of the absorbed heat, or only a portion of the absorbed heat that is insufficient to burn, melt, and/or otherwise damage the airbag cushion 110 is eventually transferred from an exterior surface of the deflector 170 to the airbag cushion 110. The heat shield deflector 170 may act as an insulator, or may have insulating properties. As further discussed below, in some embodiments, the deflector 170 may melt due to the absorbed heat. The melting may commence before or after all inflation gases have exited the inflator 150.

Figure 11B:
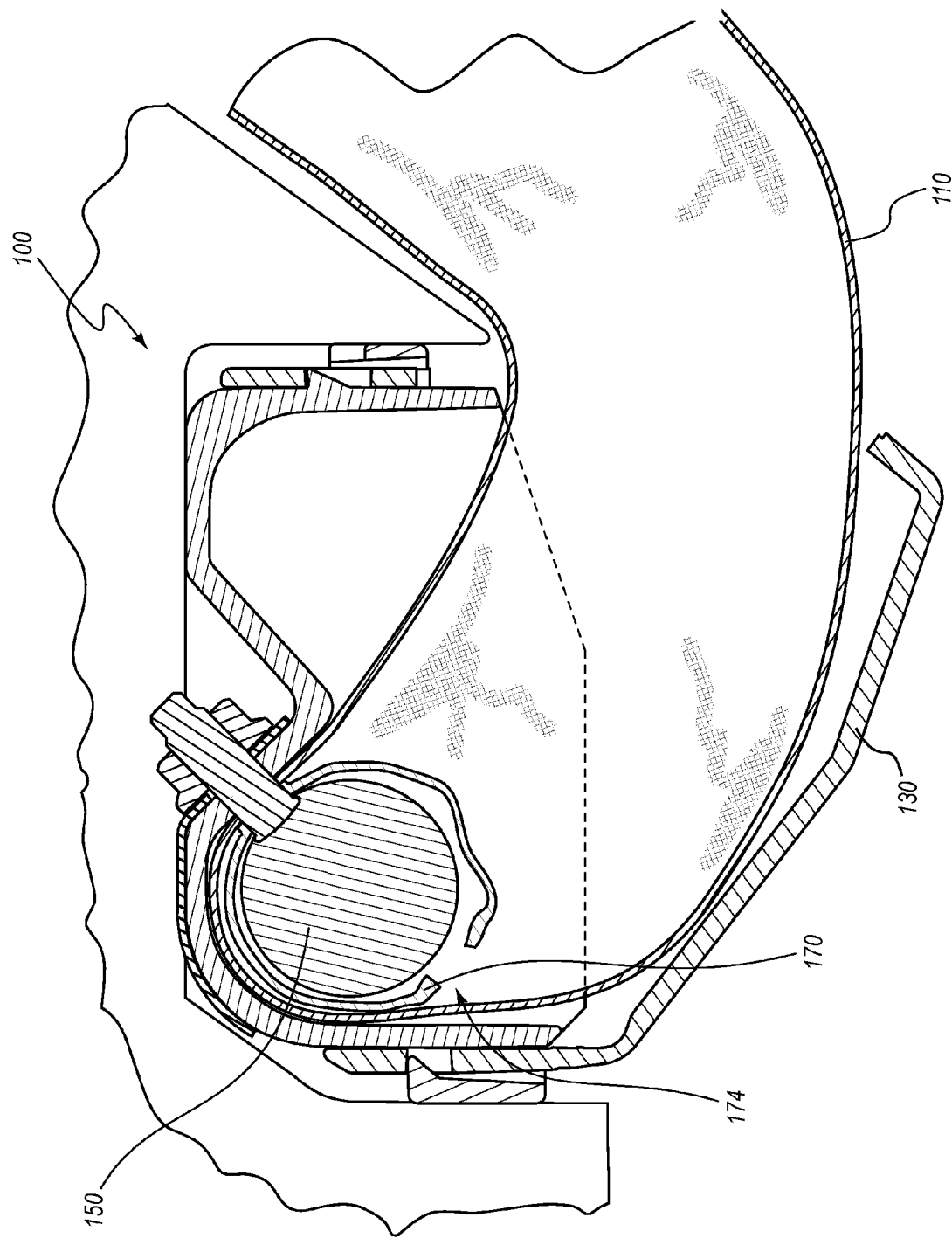
FIG. 11B is another enlarged cross-sectional side elevation view after the airbag cushion has been fully deployed and after all gases have been expelled from the inflator, wherein the heat shield deflector has been melted to a permanently deformed state.

FIG. 11B depicts a point in time during in inflation event after all of the inflation gases have exited from the inflator 150. In the illustrated embodiment, the heat shield deflector 170 has melted and been permanently deformed as a result of the absorbed heat.

In some embodiments, the heat shield deflector 170 may look substantially as shown in FIG. 11B after it has cooled and re-solidified. That is, the deflector 170 may generally retain its C-shaped configuration in cross-section. However, in other embodiments, the deflector 170 may melt to a greater extent and be deformed more significantly than what is shown in FIG. 11B. That is, in other embodiments, FIG. 11B may represent an intermediate stage of the melting and permanent reconfiguration of the deflector 170. As the melting continues, the deflector 170 may ultimately transition to a "blob" of degraded material that is sandwiched between the cushion material 110 and the inflator body 150. In some embodiments, the melting and/or reconfiguration of the deflector 170 can take place for some time after all inflation gases have exited the inflator due to residual heat retained by the deflector 170. For example, the melting and/or reconfiguration may occur for up to about 1 minute or up to about 4 minutes after the inflator 150 has been actuated and its inflation gas spent.

The heat shield deflector 170 can be formed of any suitable material that is configured to prevent the heat inflation gases that exit inflator 150 from damaging the airbag cushion 110. In particular, the heat shield deflector 170 can comprise a material that has a lower thermal conductivity than materials that are typically used for deflectors, such as certain metals, fiberglass, and/or composite structures. The heat shield deflector 170 may have a slower heat absorption rate. Accordingly, the heat shield deflector 170 can conduct heat through the thickness T at a slower rate than typical materials, which can permit the inflator 150 to expel all inflation gases and inflate the airbag cushion 110 without burn through or other loss of cushion integrity in the vicinity of the heat shield deflector 170 (e.g., at the fixable portion 105 of the airbag cushion 110 and neighboring regions). The material may also have a lower melting point than typical deflector materials. For example, the material may have a melting point that is lower than a temperature at which inflation gases exit from the inflator 150 (i.e., lower than an "expulsion temperature"). The material thus may be configured to melt when a portion of the heat from the inflation gases is absorbed by the heat shield deflector 170. The heat shield deflector 170 may melt during the course of a deployment event and may transition from an initial shape (e.g., as shown in FIGS. 6 and 7) to a permanently deformed shape (e.g., as shown in FIG. 11B) that is different from the initial shape. The melting (e.g., transition of at least a portion of the heat shield deflector 170 from a solid state to a liquid state) may begin before or after all of the inflation gases have been expelled from the inflator 150, and in further embodiments, the melting may continue for a time after the inflator 150 has expelled all inflation gases. The melting point can be determined at standard pressure (i.e., 100 kPa).

In various embodiments, the heat shield deflector 170 may be formed of a polymeric material, such as any suitable plastic. In various embodiments, the heat shield deflector 170 may be formed of one or more thermoplastic olefins (TPOs). The TPOs can be polymer/filler blends, which may include polypropylene (PP), polyethylene (PE), block copolymer polypropylene (BCPP), rubber—such as, for example, ethylene propylene rubber (EPR), EP-diene rubber (EPDM), ethylene-octene (EO), ethylene-butadiene (EB), and/or styrene-ethylene-butadiene-styrene (SEBS)—and a reinforcing filler, such as, for example, one or more of talc, fiberglass, carbon fiber, wollastonite, and metal oxy sulfate (MOS). Other or further heat shield deflectors 170 can comprise PA6, such as, or which may also be referred to as, Nylon 6, polyamid 6, polycaprolactam, poly-c-caproamide, Capron, Ultramid, or Nylatron. In other or further embodiments, the heat shield deflector 170 can comprise any suitable thermoplastic material distributed under the trade names Adflex™ or Dexflex®, which are distributed by LyondellBassell, such as any suitable Adflex™ or Dexflex® branded TPO (e.g., Dexflex® 1010). In other or further embodiments, the heat shield deflector 170 can comprise any suitable combination of any of the foregoing materials. In still other or further embodiments, the heat shield deflector 170 can comprise any suitable plastic, composite, natural material fibers, and/or film-based structure.

By way of illustrative comparison, polypropylene, which can be present in a variety of amounts in the heat shield deflector 170, can have a thermal conductivity of about 0.1 to about 0.22 watts per meter-Kelvin. In contrast, steel (at 1 percent carbon) can have a thermal conductivity of about 43 watt per meter-Kelvin.

The thickness T of the deflector 170 can be selected to provide desired properties, such as flexibility and/or heat conductivity from an inner surface to an outer surface. The deflector 170 can have a high resistance to exit gas velocities and pressures. Various embodiments of the deflector 170 can allow for reduced package space and/or lower weight. For example, the deflector 170 can have a single layer of material, which can reduce space and/or weight as compared with other designs in which multiple textile or rigid layers are used to prevent burnout of the cushion 110. Moreover, by way of illustrative comparison, Dexflex® 1010 TPO can have a density of approximately 900 kilograms per cubic meter, whereas steel can have a density of 7,850 kilograms per cubic meter. In some embodiments, a typical steel deflector may have a total weight of 14 grams and a thickness T of 0.7 millimeters. An illustrative heat shield deflector 170 such as described herein may perform suitably when the thickness T is only slightly larger—namely, about 1.0 millimeter. Even at this greater thickness, the heat shield deflector 170 is significantly lighter at approximately 5 grams (e.g., approximately ⅓ the mass).

Various embodiments of the deflector 170 may be more flexible than metal (e.g., steel) deflectors, which can facilitate assembly of the airbag assembly 100. The materials of which the deflector 170 is formed may be lower cost than other typical deflector materials.

Although the heat shield deflector 170 may melt in some embodiments, the deflector 170 may be configured to redirect the inflation gases despite its melting condition. In other embodiments, the deformation due to melting may not significantly alter the shape or conformation of the heat shield deflector 170 until after the inflation gases have been expelled from the inflator 150.

Figure 12:
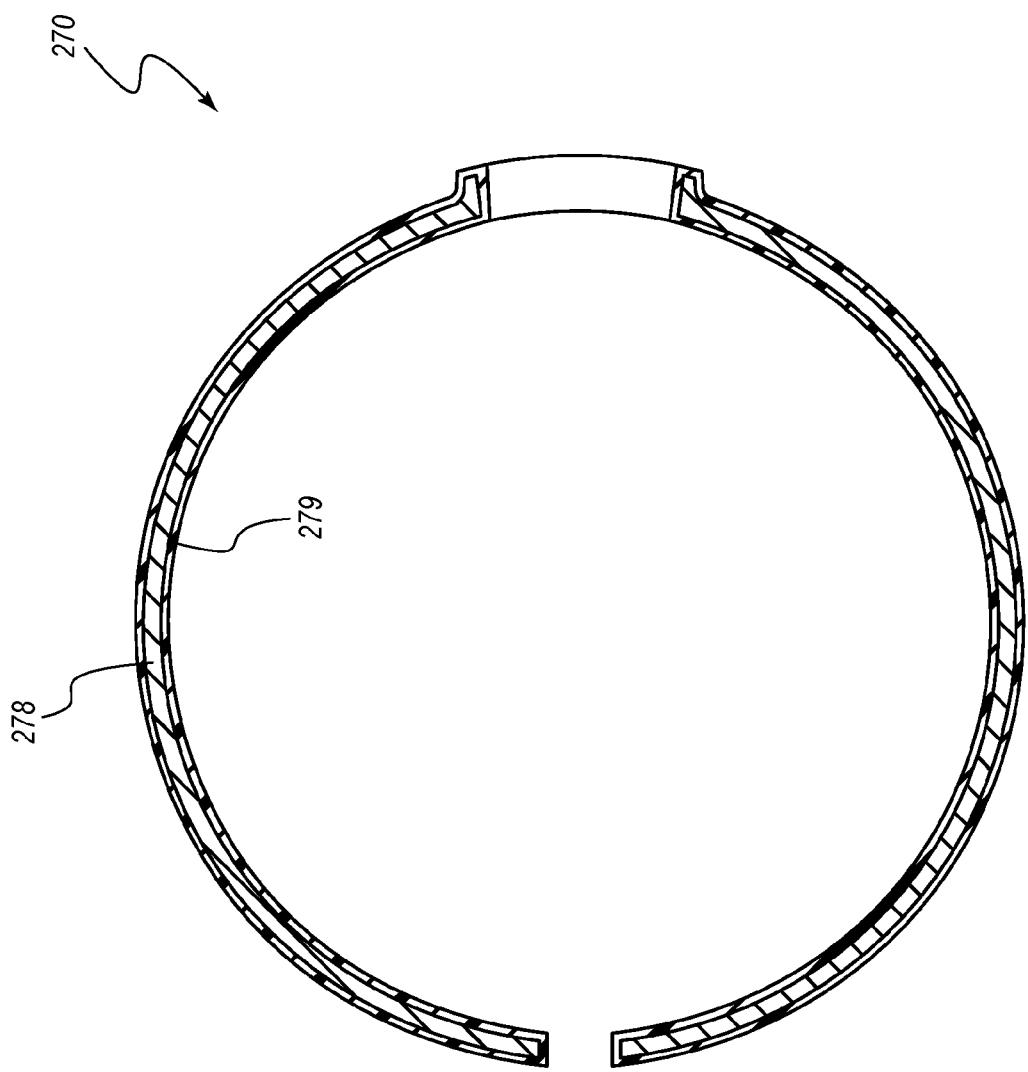
FIG. 12 is a cross-sectional view of another embodiment of a heat shield deflector that is similar to the view shown in FIG. 7.

With reference to FIG. 12, in still other embodiments, the heat shield deflector may include one or more materials that have higher thermal conductivities, such as materials that are typically used in deflectors. For example, various heat shield deflectors may include one or more of metal, ceramic, composite, fiberglass, or other materials. In the illustrated embodiment, a heat shield deflector 270 includes a base or core 278 of a relatively high thermal conductivity material (e.g., metal, ceramic, composite, fiberglass, or certain plastics) that is not configured to melt as a result of an inflation event. That is, the core can maintain its initial shape after an inflation event. The core 278 may be insulated or otherwise coated or covered by a covering, coating, or layer 279 of material having a low thermal conductivity. In some embodiments, the outer layer 279 may be configured to melt and/or slow heat transfer to an outermost surface of the deflector 270. In some embodiments, the core 278 may retain the general shape of the deflector 270, as a whole, although the outer layer 279 may melt and be permanently deformed. In some embodiments, the outer layer 279 may comprise a film, which may be applied to the core 278 in any suitable manner (e.g., blown or cast).

By way of illustrative example, in some embodiments, the core 278 comprises a thin or fine mesh of ceramic material. For example, the core 278 may be a non-melting skeleton of ceramic (e.g., about 0.2 millimeters thick). The outer layer 279 may be a uniformly thick layer of TPO or other suitable low thermal conductivity material (e.g., about 0.2 millimeters thick, thus resulting in a 0.6 millimeter thick deflector 270). In other embodiments, the ceramic core 278 may be replaced with an expanded low melt plastic foam (e.g., about 0.2 millimeters thick).

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

Without further elaboration, it is believed that one skilled in the art can use the preceding description to utilize the present disclosure to its fullest extent. The examples and embodiments disclosed herein are to be construed as merely illustrative and not a limitation to the scope of the present disclosure in any way. It will be apparent to those having skill in the art that changes may be made to the details of the above-described embodiments without departing from the underlying principles of the disclosure described herein. In other words, various modifications and improvements of the embodiments specifically disclosed in the description above are within the scope of the appended claims. Note that elements recited in means-plus-function format are intended to be construed in accordance with 35 U.S.C. §112 ¶6. The scope of the disclosure is therefore defined by the following claims.

The invention claimed is:

1. An airbag assembly comprising:
   an inflatable airbag cushion that defines a cavity;
   an inflator that comprises one or more ports in fluid communication with the cavity of the airbag cushion, wherein the inflator is configured to expel inflation gases through the one or more ports at an expulsion temperature; and
   a heat shield deflector positioned to redirect the inflation gases that are expelled through the one or more ports of the inflator before the inflation gases progress into contact with the airbag cushion to deploy the airbag cushion, wherein the heat shield deflector comprises a material having a melting point that is lower than the expulsion temperature;
   wherein the inflator defines a length along a longitudinal direction, and wherein the heat shield deflector extends along only a portion of the length of the inflator.

2. The airbag assembly of claim 1, wherein the heat shield deflector comprises a thermoplastic olefin material.

3. The airbag assembly of claim 1, wherein the heat shield deflector is configured to melt due to absorption of heat from the inflation gases so as to be permanently deformed.

4. The airbag assembly of claim 1, wherein at least a portion of the heat shield deflector is configured to temporarily be in a liquid state after the inflator has finished expelling inflation gases through the one or more ports.

5. The airbag assembly of claim 1, wherein the heat shield deflector comprises a core formed of a material that is not configured to change configurations as a result of heating from the inflation gases.

6. The airbag assembly of claim 1, wherein the inflator is elongated along a longitudinal axis, wherein the heat shield deflector is curved about the longitudinal axis to encompass a majority of a perimeter of the inflator along a cross-sectional plane that both extends through the inflator openings and is perpendicular to the longitudinal axis, and wherein the heat shield deflector is positioned between the inflator and the airbag cushion along a portion of the cross-sectional plane.

7. The airbag assembly of claim 1, further comprising a housing, wherein each of the heat shield deflector, the airbag cushion, and the housing define aligned apertures, wherein the inflator comprises a mounting stem that extends through the aligned apertures to couple the inflator, the heat shield deflector, and the airbag cushion to the housing.

8. An airbag assembly comprising:
   an inflatable airbag cushion that defines a cavity;
   an inflator that comprises one or more ports in fluid communication with the cavity of the airbag cushion, wherein the inflator is configured to expel inflation gases through the one or more ports;
   a heat shield deflector positioned to redirect the inflation gases that are expelled through the one or more ports of the inflator before the inflation gases progress into contact with the airbag cushion to deploy the airbag cushion, wherein the heat shield deflector defines a first shape prior to activation of the inflator, and wherein the heat shield deflector is configured to be permanently deformed to a second shape that is different from the first shape due to the heat shield deflector absorbing heat from inflation gases that are redirected by the heat shield deflector during deployment of the airbag cushion; and
   a housing, wherein each of the heat shield deflector, the inflatable airbag cushion, and the housing define aligned apertures;
   wherein the inflator further comprises a mounting stem that extends through the aligned apertures to couple the inflator, the heat shield deflector, and the airbag cushion to the housing;
   wherein at least a portion of the heat shield deflector is configured to temporarily be in a liquid state after the inflator has finished expelling inflation gases through the one or more ports.

9. The airbag assembly of claim 8, wherein the heat shield deflector is formed of a polymeric material.

10. The airbag assembly of claim 8, wherein at least a portion of the heat shield deflector is configured to melt prior to expulsion of all inflation gases from the inflator during a deployment event.

11. The airbag assembly of claim 8, wherein the heat shield deflector comprises a core formed of a material that is not configured to change configurations as a result of heating from the inflation gases, and wherein the heat shield deflector further comprises an outer layer that is configured to melt as a result of heating from the inflation gases.

12. The airbag assembly of claim 8, wherein the inflator is elongated along a longitudinal axis, wherein the heat shield deflector is curved about the longitudinal axis to encompass a majority of a perimeter of the inflator along a cross-sectional plane that both extends through the inflator openings and is perpendicular to the longitudinal axis, and wherein the heat shield deflector is positioned between the inflator and the airbag cushion along a portion of the cross-sectional plane.

13. The airbag assembly of claim 8, wherein the inflator defines a length along a longitudinal direction, and wherein the heat shield deflector extends along only a portion of the length of the inflator.

14. An airbag assembly comprising:
   an inflatable airbag cushion that defines a cavity;
   an inflator that comprises one or more ports in fluid communication with the cavity of the airbag cushion, wherein the inflator is configured to expel inflation gases through the one or more ports; and
   a heat shield deflector positioned to redirect the inflation gases that are expelled through the one or more ports of the inflator before the inflation gases progress into contact with the airbag cushion to deploy the airbag cushion, wherein at least a portion of the heat shield deflector is configured to melt after the inflator has finished expelling inflation gases through the one or more ports;
   wherein the heat shield deflector comprises a base that is formed of one or more of a metal, plastic, composite, or ceramic material, wherein the heat shield deflector further comprises a covering on the base that faces the inflator, and wherein the covering is configured to melt due to heat absorbed from the inflation gases.

15. The airbag assembly of claim 14, wherein a portion of the heat shield deflector is configured to melt prior to expulsion of all inflation gases from the inflator during a deployment event.

16. The airbag assembly of claim 14, wherein the heat shield deflector comprises one or more of a metal, plastic, composite, or ceramic material.

17. An airbag assembly comprising:
   an inflatable airbag cushion that defines a cavity;
   an inflator that comprises one or more ports in fluid communication with the cavity of the airbag cushion, wherein the inflator is configured to expel inflation gases through the one or more ports at an expulsion temperature; and
   a heat shield deflector positioned to redirect the inflation gases that are expelled through the one or more ports of the inflator before the inflation gases progress into contact with the airbag cushion to deploy the airbag cushion, wherein the heat shield deflector comprises a material having a melting point that is lower than the expulsion temperature;
   wherein the inflator is elongated along a longitudinal axis, wherein the heat shield deflector is curved about the longitudinal axis to encompass a majority of a perimeter of the inflator along a cross-sectional plane that both extends through the inflator openings and is perpendicular to the longitudinal axis, and wherein the heat shield deflector is positioned between inflator and the airbag cushion along a portion of the cross-sectional plane.

18. The airbag assembly of claim 17, further comprising a housing, wherein each of the heat shield deflector, the airbag cushion, and the housing define aligned apertures, wherein the inflator comprises a mounting stem that extends through the aligned apertures to couple the inflator, the heat shield deflector, and the airbag cushion to the housing.

19. The airbag assembly of claim 17, wherein the heat shield deflector comprises a base that is formed of the metal, plastic, composite, or ceramic material, wherein the heat shield deflector further comprises a covering on the base that faces the inflator, and wherein the covering is configured to melt due to heat absorbed from the inflation gases.

\* \* \* \* \*